United States Patent
Marx et al.

(10) Patent No.: US 7,064,503 B2
(45) Date of Patent: Jun. 20, 2006

(54) ACTIVE NOISE COMPENSATION

(75) Inventors: Walter Marx, Nürnberg (DE);
Hans-Jürgen Tölle, Nürnberg (DE);
Reinhard Vogel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/432,984

(22) PCT Filed: Nov. 19, 2001

(86) PCT No.: PCT/DE01/04344

§ 371 (c)(1),
(2), (4) Date: Nov. 25, 2003

(87) PCT Pub. No.: WO02/43237

PCT Pub. Date: May 30, 2002

(65) Prior Publication Data

US 2004/0066161 A1 Apr. 8, 2004

(30) Foreign Application Priority Data

Nov. 23, 2000 (DE) .............................. 101 58 293

(51) Int. Cl.
*H02P 5/00* (2006.01)
*G05D 1/00* (2006.01)

(52) U.S. Cl. ...................... 318/128; 318/148; 318/588; 290/17; 440/1; 440/50

(58) Field of Classification Search ........ 318/609–611, 318/702, 608, 127, 128; 184/3.1; 700/45, 700/77.04, 280; 324/207.21; 702/147; 440/6, 440/144 E; 181/207; 52/1, 167 R; 310/15–19, 310/51
See application file for complete search history.

(56) References Cited

U.S. PATENT DOCUMENTS

| | | | | |
|---|---|---|---|---|
| 1,529,318 A * | 3/1925 | Macmillan | .................. | 318/144 |
| 2,321,302 A * | 6/1943 | Liwschitz | .................... | 318/148 |
| 4,036,164 A * | 7/1977 | Kowach et al. | ................ | 440/1 |
| 4,200,859 A * | 4/1980 | Evans et al. | .................... | 367/1 |
| 4,338,525 A * | 7/1982 | Kilgore | ....................... | 290/17 |
| 4,645,963 A | 2/1987 | Plackner et al. | | |
| 4,689,821 A * | 8/1987 | Salikuddin et al. | ........ | 381/71.9 |
| 4,906,213 A * | 3/1990 | Esthimer | ..................... | 440/50 |
| 5,034,675 A | 7/1991 | Nerowski et al. | | |
| 5,117,141 A | 5/1992 | Hawsey et al. | | |
| 5,126,641 A * | 6/1992 | Putman et al. | .............. | 318/128 |
| 5,182,887 A * | 2/1993 | Uno et al. | ................. | 52/167.1 |
| 5,223,775 A | 6/1993 | Mongeau | | |
| 5,239,789 A * | 8/1993 | Uno et al. | ........................ | 52/1 |
| 5,323,093 A | 6/1994 | Kikuchi | | |
| 5,821,725 A | 10/1998 | Wang et al. | | |
| 6,484,845 B1 * | 11/2002 | Schleicher et al. | ......... | 181/207 |
| 6,592,412 B1 * | 7/2003 | Geil et al. | ..................... | 440/6 |
| 6,653,829 B1 * | 11/2003 | Henry et al. | ........... | 324/207.21 |
| 6,681,152 B1 * | 1/2004 | Remington et al. | ......... | 700/280 |

(Continued)

FOREIGN PATENT DOCUMENTS

EP 0 194 433 A1 9/1986

(Continued)

*Primary Examiner*—Paul Ip
(74) *Attorney, Agent, or Firm*—Harness, Dickey & Pierce, P.L.C.

(57) ABSTRACT

A method is for controlling a multi-phase electrical ship propulsion motor that is supplied with electric energy via a power converter. The ship propulsion motor is preferably a permanently excited motor with at least three windings. The phase currents flowing in the windings are controlled via the power converter to minimize the body noise emitted by the electrical ship propulsion motor.

16 Claims, 2 Drawing Sheets

U.S. PATENT DOCUMENTS

| | | |
|---|---|---|
| 6,684,114 B1 * | 1/2004 | Erickson et al. .............. 700/45 |
| 6,752,670 B1 * | 6/2004 | Geil .............................. 440/1 |
| 2003/0102188 A1 * | 6/2003 | Gunacker et al. ............ 184/3.1 |
| 2003/0124919 A1 * | 7/2003 | Geil .............................. 440/1 |
| 2004/0135535 A1 * | 7/2004 | Kunzel et al. .............. 318/611 |

FOREIGN PATENT DOCUMENTS

| | | |
|---|---|---|
| EP | 0 533 359 A2 | 3/1993 |
| EP | 0800263 | 10/1997 |
| WO | 9936312 | 7/1999 |

* cited by examiner

ACTIVE NOISE COMPENSATION

This application is the national phase under 35 U.S.C. § 371 of PCT International Application No. PCT/DE01/04344 which has an International filing date of Nov. 19, 2001, which designated the United States of America and which claims priority on German Patent Application number DE 100 58 293.1 filed Nov. 23, 2000, the entire contents of which are hereby incorporated herein by reference.

FIELD OF THE INVENTION

The invention generally relates to a method for controlling a polyphase electrical ship propulsion motor which is supplied with electrical power via a converter. T ship propulsion motor is preferably in the form of a motor with permanent magnet excitation having at least three windings.

BACKGROUND OF THE INVENTION

Polyphase electrical ship propulsion motors, which are fed by converters, produce low-frequency structure-borne sound which is essentially due to oscillating moments in the motor. Such structure-borne sound emission is particularly dangerous for submarines, since low-frequency noise is carried over particularly long distances in water.

SUMMARY OF THE INVENTION

An object of an embodiment of the invention is to suppress (preferably, as far as possible) structure-borne sound emissions. In particular, it is an object to suppress them from motors in submarines, and also from the motors in electric steering propellers, irrespective of whether these are used for navy ships or for cruise ships etc.

An object may be achieved in that the phase currents flowing in the windings of the electrical propulsion motor are controlled via the converter in order to lessen, preferably minimize, the structure-borne noise originating from the electrical ship propulsion motor. A control system such as this may, for example, be in the form of vectorial control of the residual direct-current components to produce a total current of zero. This very considerably reduces the resultant low-frequency structure-borne sound level from such motors. The acoustic signature, in particular of submarines, but also of navy service ships, can thus be approximated to the acoustic signature of electrical main propulsion machines which are not fed via converters.

DETAILED DESCRIPTION OF THE PREFERRED EMBODIMENTS

Figure 1:
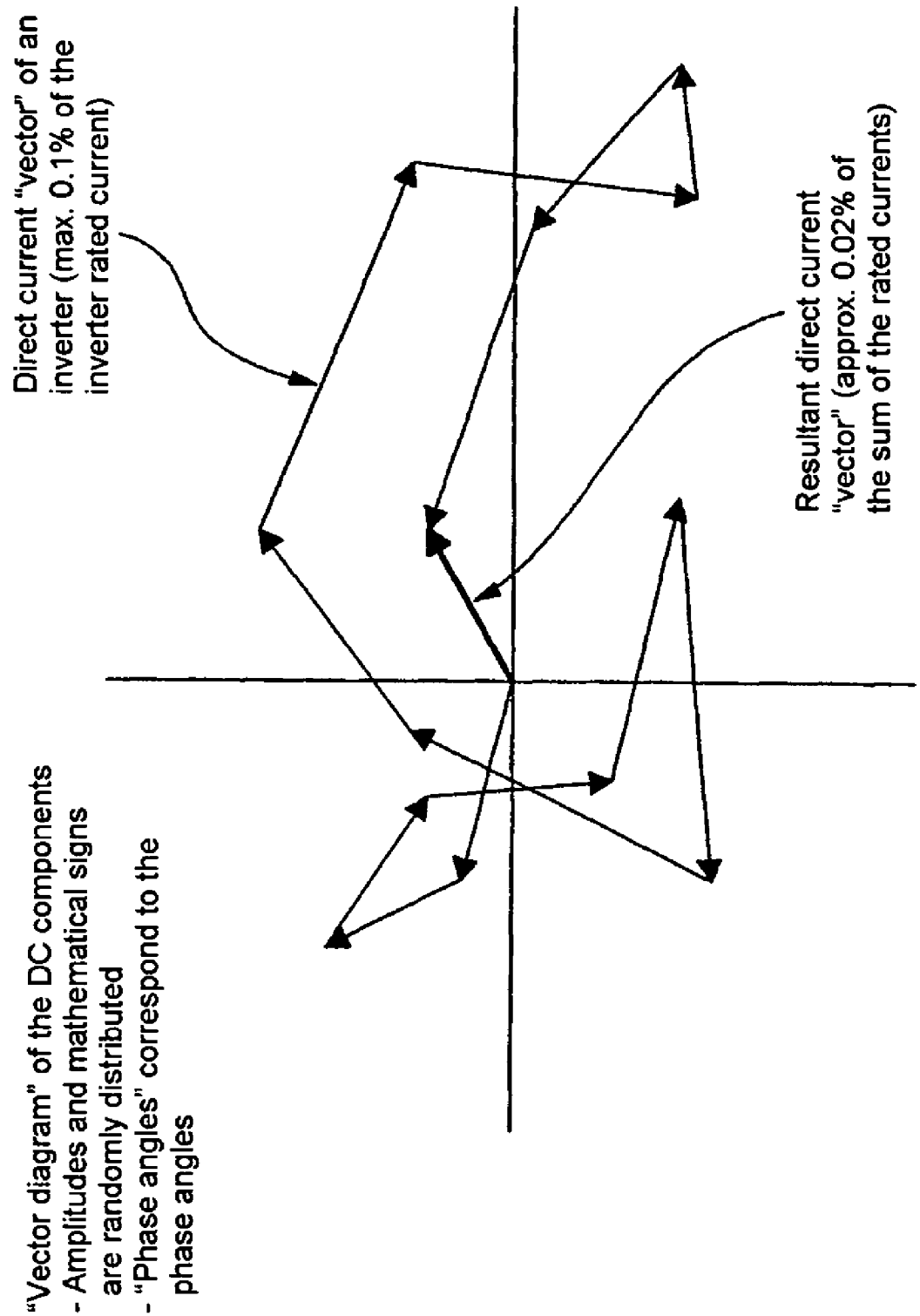
FIG. 1 shows a vector diagram with the residual, very small, resultant direct-current vector.

The control principle can be seen in FIG. 1, wherein FIG. 1 shows a vector diagram with the residual, very small, resultant direct-current vector. The control system is preferably in the form of software, although a hardware implementation is also possible. The signals which are produced are advantageously transmitted via existing bus systems.

In at least one embodiment of the invention, each individual phase of the converter has an associated regulator for suppressing the direct-current component. The regulator may be a Simatic-S7 regulator. The regulators for the individual phases are linked to one another and form a control system in which the mutual influence between the individual winding currents is taken into account. In particular, the direct-current component is suppressed as far as possible. Actual values depicted with the aid of known sensors and calculation methods are used as the basis of the control system. Acceleration sensors, angle position sensors etc. are also used as sensors.

Figure 2:
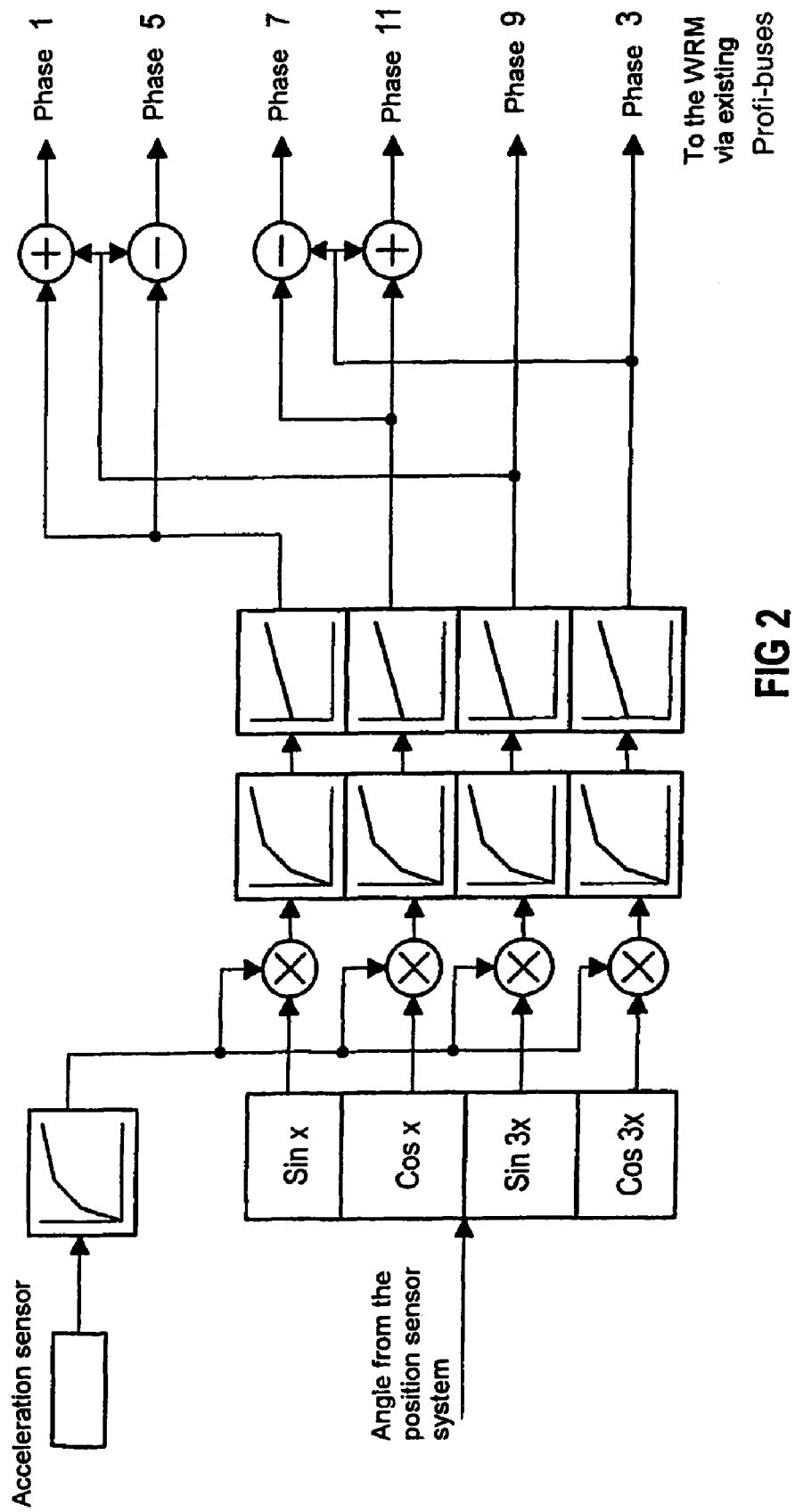
FIG. 2 shows an illustration, shown in schematic form, of the influence of the individual phases with the arrangement of selected sensors.

FIG. 2 shows an illustration, shown in schematic form, of the influence of the individual phases with the arrangement of selected sensors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for controlling a polyphase electrical ship propulsion motor supplied with the electrical power converter, comprising:
   detecting phase currents flowing in the windings of an electrical propulsion motor;
   determining low frequency structure-borne noise signals from detected phase currents;
   generating residual resultant direct current vectors as a function of the determined low frequency structure-borne noise signals to control the residual direct current components to produce a total current of zero; and
   controlling DC components of phase currents flowing in the windings via the converter such that noise-producing current components counteract one another in order to lower the structure-borne noise originating from the electrical ship propulsion motor.

2. The method as claimed in claim 1, wherein the DC components which occur in the windings are controlled to a total current of zero.

3. The method as claimed in claim 2, wherein a control system works to keep the low-frequency components of the structure-borne noise that is produced, small.

4. The method as claimed in claim 3, wherein the control system is in the form of a software control system.

5. The method as claimed in claim 3, wherein a control system in the form of a system with at least one programmable controller is used as the control system.

6. The method as claimed in claim 5, wherein the noise is lowered by configuration of the system with at least one programmable controller.

7. The method as claimed in claim 6, wherein the configuration process is carried out with respect to current curve forms, frequency control and pulse formation.

8. The method as claimed in claim 5, wherein the configuration process is carried out with respect to current curve forms, frequency control and pulse formation.

9. The method as claimed in claim 1, wherein the method is used in underwater vessels.

10. The method as claimed in claim 1, wherein the method is used for motors for electric steering propellers.

11. The method of claim 1, wherein the ship propulsion motor is in the form of a motor with permanent magnet excitation including at least three windings.

12. The method as claimed in claim 1, wherein noise-producing current components are controlled such that their noise-producing effects tend to cancel one another out as far as possible.

13. The method as claimed in claim 12, wherein the DC components which occur in the windings are controlled to a total current of zero.

14. The method as claimed in claim 1, wherein system for the step of controlling is in the form of a software control system.

15. The method as claimed in claim 1, wherein a control system in the form of a system with at least one programmable controller is used for the step of controlling.

16. The method as claimed in claim 15, wherein the noise is lowered by configuration of the system with at least one programmable controller.

* * * * *